(12) United States Patent
Mergen

(10) Patent No.: US 8,116,441 B2
(45) Date of Patent: Feb. 14, 2012

(54) CALL ROUTING BASED ON PHYSICAL LOCATION OF CALLED PARTY

(75) Inventor: John-Francis Mergen, Baltimore, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1362 days.

(21) Appl. No.: 11/690,268

(22) Filed: Mar. 23, 2007

(65) Prior Publication Data

US 2008/0233969 A1    Sep. 25, 2008

(51) Int. Cl.
*H04M 1/66* (2006.01)
(52) U.S. Cl. .............. 379/198; 379/201.07; 379/207.11; 379/373.02; 379/903; 379/913
(58) Field of Classification Search ............. 379/142.06, 379/142.07, 142.1, 142.15, 142.17, 88.01, 379/198, 201.07, 201.08, 201.09, 207.11, 379/209.01, 210.02, 216.01, 373.02, 373.04, 379/374.02, 903, 913, 914
See application file for complete search history.

(56) References Cited

U.S. PATENT DOCUMENTS

| | | | | |
|---|---|---|---|---|
| 5,515,426 A | * | 5/1996 | Yacenda et al. | 379/201.07 |
| 5,822,418 A | * | 10/1998 | Yacenda et al. | 379/201.07 |
| 6,009,333 A | * | 12/1999 | Chaco | 455/456.5 |
| 6,453,164 B1 | * | 9/2002 | Fuller et al. | 455/445 |
| 6,901,255 B2 | * | 5/2005 | Shostak | 455/422.1 |
| 7,120,238 B1 | * | 10/2006 | Bednarz et al. | 379/201.1 |
| 7,684,554 B1 | * | 3/2010 | Vincent et al. | 379/220.01 |

\* cited by examiner

*Primary Examiner* — Binh Tieu

(57) ABSTRACT

A system may include a locator device to track a location of a user, store information identifying locations of a group of telephone devices, and identify one telephone device of the group of telephone devices based on the location of the one telephone device and the location of the user in response to an incoming telephone call request for the user.

21 Claims, 8 Drawing Sheets

| USER ID 510 | PIN 520 | LOCATION 530 | RING SIGNAL 540 |
|---|---|---|---|
| ID 1 | PIN | LOCATION | RING SIGNAL |
| ID 2 | PIN | LOCATION | RING SIGNAL |
| ID 3 | PIN | LOCATION | RING SIGNAL |
| ID 4 | PIN | LOCATION | RING SIGNAL |
| ... | ... | ... | ... |
| ID P | PIN | LOCATION | RING SIGNAL |

CALL ROUTING BASED ON PHYSICAL LOCATION OF CALLED PARTY

BACKGROUND INFORMATION

Wireless mobile technology has become accepted as a necessary part of the modern work place. Employees use wireless mobile technology to send and receive voice calls, electronic mail (e-mail), instant messages, etc. However, there are a number of environments where this type of universal connectivity is not available and wireless solutions are not acceptable. These include, for example, certain hospital, research, and industrial settings where the powerful emission (e.g., 0.01 to 5 watts) from a mobile device can interfere with the operation of equipment, measurements, or processes. Physically isolated facilities, such as those located underground, are another example where wireless connectivity presents a challenge. Yet another example includes classified environments. In these environments, no radio emitters can be used due to concerns regarding the loss of information. There is a substantial loss of efficiency and an increase in complexity in the chain of command due to the added burden of locating and connecting people.

BRIEF DESCRIPTION OF THE DRAWINGS

FIG. 5 is a portion of another exemplary database that may be associated with the user locator of FIG. 1;

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Figure 1:
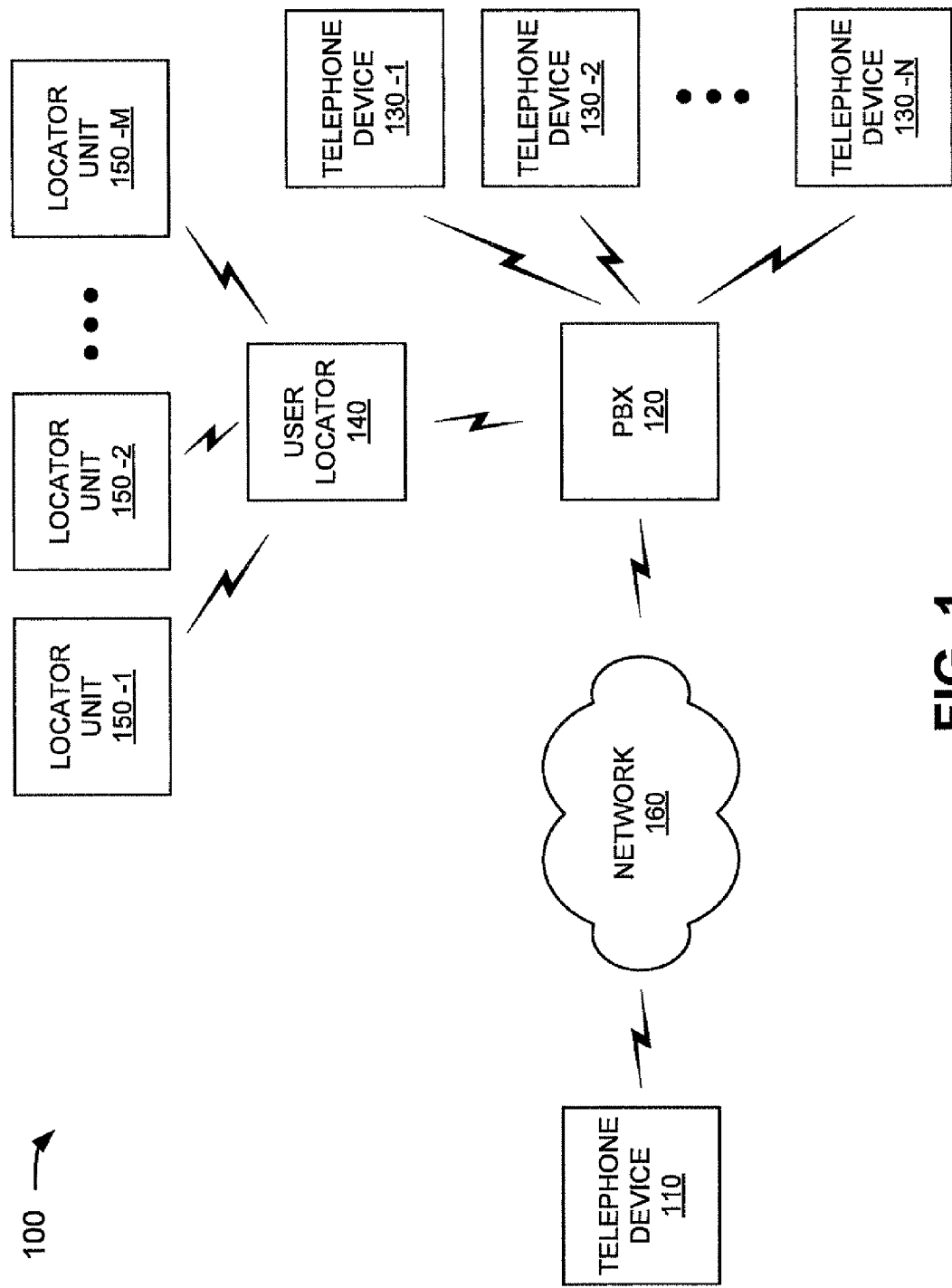
FIG. 1 is an exemplary network in which systems and methods, consistent with exemplary embodiments, may be implemented.

FIG. 1 is an exemplary network in which systems and methods, consistent with exemplary embodiments, may be implemented. As illustrated, network 100 may include a telephone device 110, a private branch exchange (PBX) 120, a group of telephone devices 130-1 through 130-N (referred to collectively as "telephone devices 130"), a user locator 140, a group of locator units 150-1 to 150-M (referred to collectively as "locator units 150"), and a network 160. The number of telephone devices 110, PBXs 120, telephone devices 130, user locators 140, locator units 150, and networks 160 illustrated in FIG. 1 is provided for simplicity. In practice, there may be more telephone devices 110, PBXs 120, user locators 140, and networks 160 and/or fewer telephone devices 130 or locator units 150. Moreover, it will be appreciated that one or more devices in FIG. 1 may perform the functions of one or more other devices illustrated in FIG. 1.

Telephone device 110 may include one or more devices capable of transmitting and/or receiving voice communications. For example, telephone device 110 may include a plain old telephone system (POTS) telephone, a Session Initiation Protocol (SIP) telephone, an H.323 telephone, a wireless telephone (such as a cordless telephone, a cellular telephone, etc.), a computer device (e.g., a personal computer, a laptop, a personal digital assistant, etc.), and/or another type of device capable of transmitting and/or receiving voice communications.

PBX 120 may include one or more devices that route calls via trunks or lines for a business customer or location. In one embodiment, PBX 120 may be implemented as a private automated branch exchange. Telephone devices 130 may include devices, such as POTS telephones, capable of receiving and/or transmitting voice communications from/to PBX 120. In one embodiment, telephone devices 130 connect to PBX 120 via wired connections.

User locator 140 may include one or more devices that maintain information regarding the location of users within an area served by PBX 120 (e.g., an office, a building, a group of buildings, etc.). In one embodiment, user locator 140 may include, for example, a radio frequency identification (RFID) tracking device, a global positioning satellite (GPS) tracking device, an infra-red (IR) beacon tracking device, a badge reader, a biometric scanning device (e.g., a hand punch, a fingerprint reader, an iris scanner, a voice recognition device, etc.), and/or another type of device capable of tracking the location of a user. In a second embodiment, user locator 140 may receive location information from a user (e.g., where the user reports his/her location directly to the user locator 140). User locator 140 may also maintain information regarding the location of telephone devices 130 within the area served by PBX 120. User locator 140 may connect to PBX 120 via a wired or wireless connection.

Locator units 150 may include devices that may be associated with users to allow user locator 140 to track the users. For example, locator units 150 may include an RFID tag, a GPS chip, an IR beacon, a badge that includes user identification information, etc. When self-reporting and/or biometric scanning is used by user locator 140, locator units 150 may not be needed in network 100.

Network 160 may include one or more networks of any type, including a Public Land Mobile Network (PLMN), a Public Switched Telephone Network (PSTN), a local area network (LAN), a metropolitan area network (MAN), a wide area network (WAN), the Internet, an intranet, etc. The one or more PLMNs may further include packet-switched sub-networks, such as, for example, General Packet Radio Service (GPRS), Cellular Digital Packet Data (CDPD), and/or Mobile Internet Protocol (IP) sub-networks. Telephone device 110 and PBX 120 may connect to network 160 via wired or wireless connections.

Figure 2:
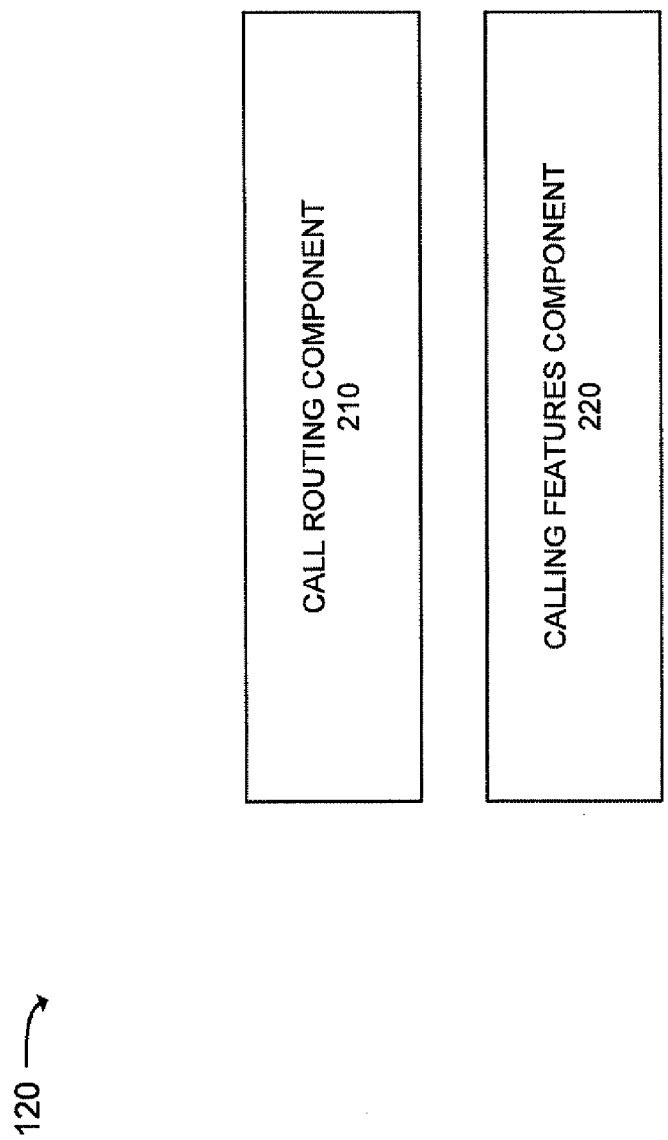
FIG. 2 is an exemplary functional block diagram of a portion of the private automated branch exchange (PABX) of FIG. 1.

FIG. 2 is an exemplary functional block diagram of a portion of PBX 120 according to an exemplary embodiment. As illustrated, PBX 120 may include a call routing component 210 and a calling features component 220. PBX 120 may include additional components than illustrated in FIG. 2 that aid in processing incoming and outgoing telephone calls.

Call routing component 210 may receive a telephone call request from network 160 and route the telephone call request to a telephone device 130-1 through 130-N. Call routing component 210 may also receive a telephone call request from a telephone device 130-1 through 130-N and route the telephone call request to another telephone device in telephone devices 130 or to network 160 for routing towards its appropriate destination.

Calling features component 220 may provide calling features for calls destined to telephone devices 130. The calling features may include, for example, the ability to park a call or to record a voicemail message.

Figure 3:
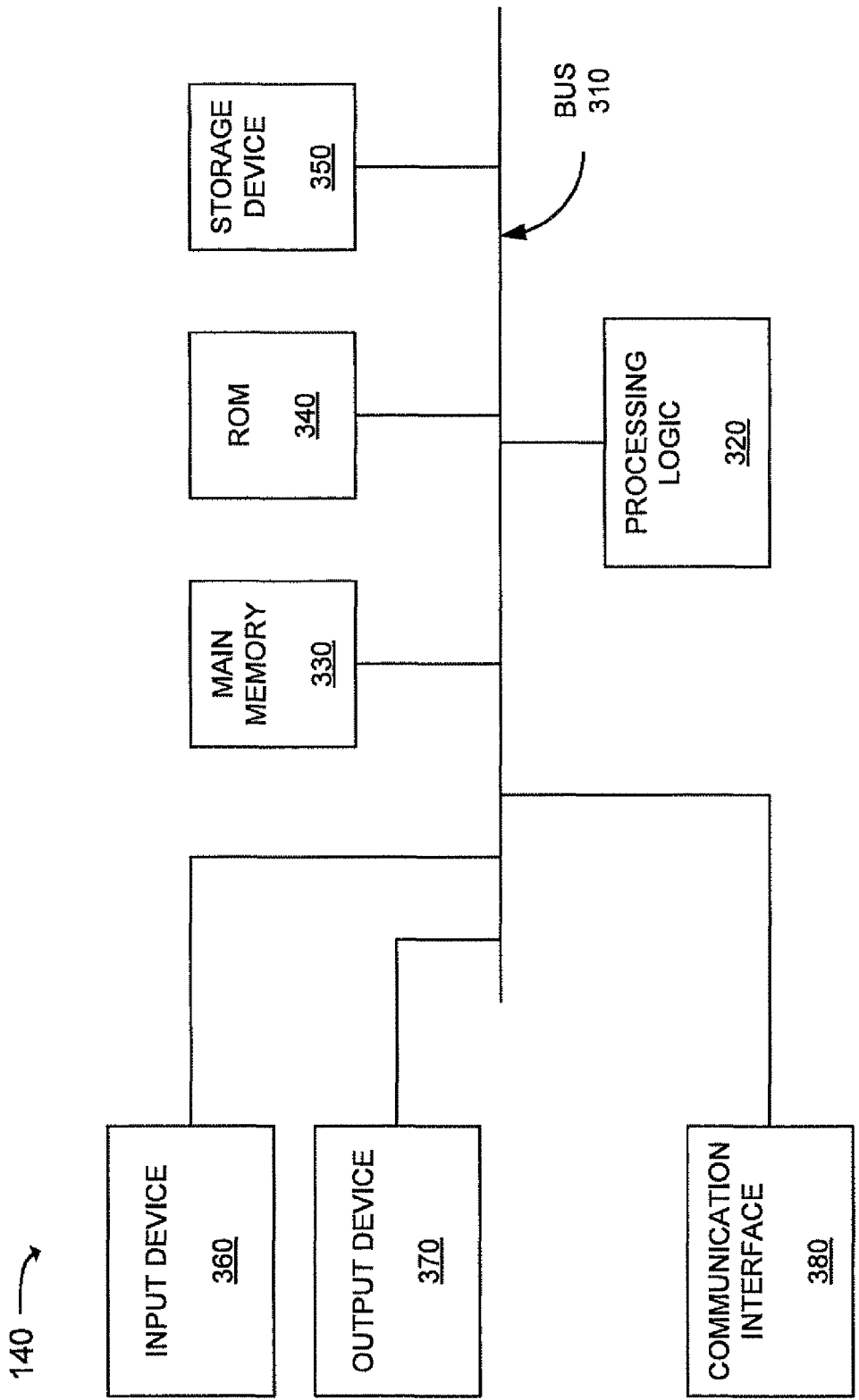
FIG. 3 is an exemplary diagram of the user locator of FIG. 1.

FIG. 3 is an exemplary diagram of user locator 140 according to an exemplary embodiment. As illustrated, user locator 140 may include a bus 310, processing logic 320, a main memory 330, a read only memory (ROM) 340, a storage device 350, an input device 360, an output device 370, and a communication interface 380. It will be appreciated that user locator 140 may include additional (or other) components than illustrated in FIG. 3.

Bus 310 may include a path that permits communication among the elements of user locator 140. Processing logic 320 may include a processor, microprocessor, or other type of processing logic, such as an application specific integrated circuit (ASIC), field programmable gate array (FPGA), etc., that may interpret and execute instructions. Main memory 330 may include a random access memory (RAM) or another type of dynamic storage device that may store information and instructions for execution by processing logic 320. ROM 340 may include a ROM device or another type of static storage device that may store static information and instructions for use by processing logic 320. Storage device 350 may include semiconductor memory (e.g., a flash drive) and/or a magnetic and/or optical recording medium and its corresponding drive.

Input device 360 may include a mechanism that permits an operator to input information to user locator 140, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables user locator 140 to communicate with other devices and/or systems, such as PBX 120 and/or locator units 150-1 through 150-M.

As will be described in detail below, user locator 140 may perform certain operations. User locator 140 may perform these, and other operations, in response to processing logic 320 executing software instructions contained in a computer-readable medium, such as main memory 330. A computer-readable medium may be defined as a physical or logical memory device and/or carrier wave.

The software instructions may be read into main memory 330 from another computer-readable medium, such as storage device 350, or from another device via communication interface 380. The software instructions contained in main memory 330 may cause processing logic 320 to perform processes that will be described later. Alternatively, hardwired circuitry may be used in place of, or in combination with, software instructions to implement processes consistent with exemplary embodiments. Thus, embodiments described herein are not limited to any specific combination of hardware circuitry and software.

Figure 4:
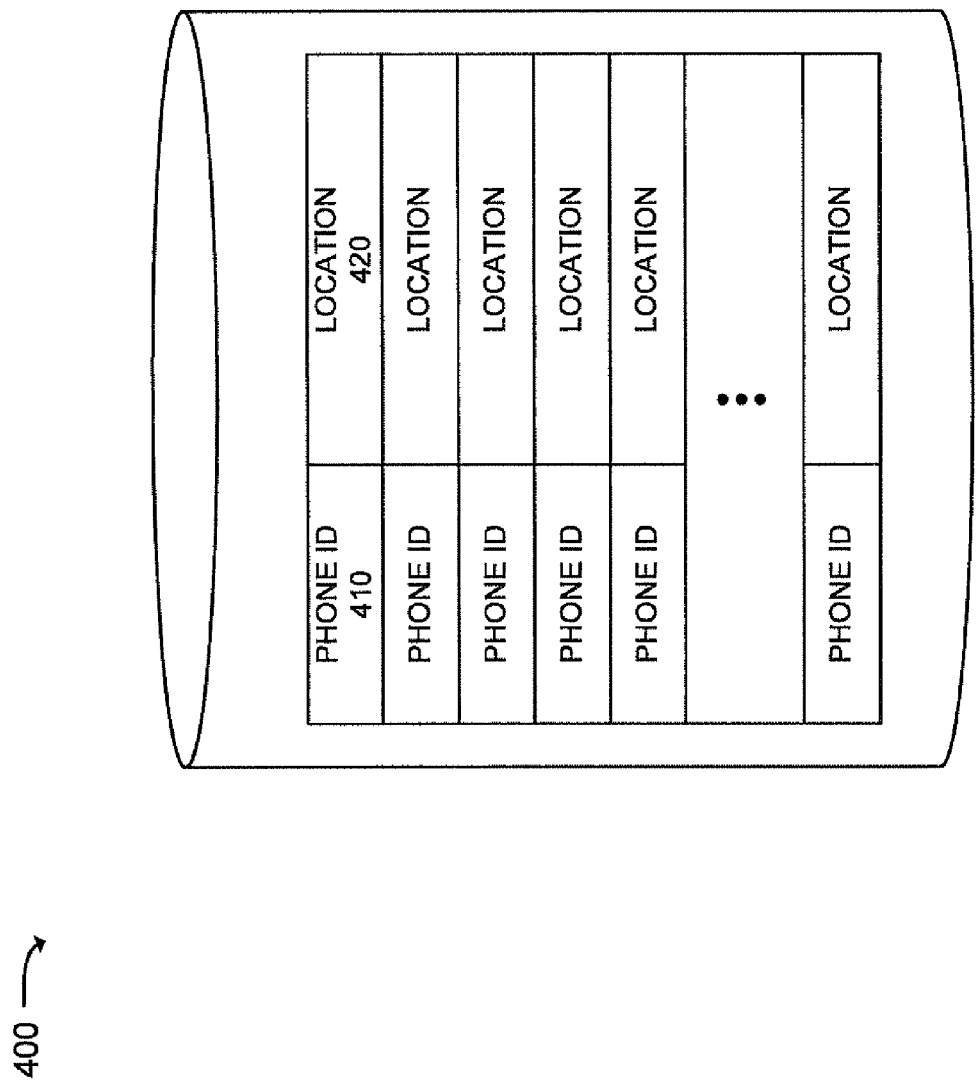
FIG. 4 is a portion of an exemplary database that may be associated with the user locator of FIG. 1.

FIG. 4 is a portion of an exemplary database 400 that may be associated with user locator 140. While only one database is described below, it will be appreciated that database 400 may consist of multiple databases stored locally at user locator 140, or stored at one or more different and possibly remote locations.

As illustrated, database 400 may maintain a group of entries in the following exemplary fields: phone identification (ID) field 410 and location field 420. Database 400 may maintain additional information (not shown) that aids user locator 140 in identifying an appropriate telephone device 130-1 through 130-N to which to route a call.

Phone identification field 410 may store information that uniquely identifies a telephone device 130-1 through 130-N. The information may include, for example, an identifier and/or other information that allows PBX 120 to route a telephone call request to a particular telephone device 130-1 through 130-N.

Location field 420 may store information identifying a location of the telephone device identified in phone identification field 410. The location information may be stored as a group of coordinates (e.g., a set of longitude and latitude coordinates), as information identifying a room within the area served by PBX 120, or in another manner.

FIG. 5 is a portion of another exemplary database 500 that may be associated with user locator 140. While only one database is described below, it will be appreciated that database 500 may consist of multiple databases stored locally at user locator 140, or stored at one or more different and possibly remote locations.

As illustrated, database 500 may include a group of entries in the following exemplary fields: user identification (ID) field 510, personal identification number (PIN) field 520, location field 530, and ring signal field 540. Database 500 may contain additional fields (not shown) that aid user locator 140 in tracking users and identifying user preferences.

User identification field 510 may store information that uniquely identifies a user. For example, in one exemplary embodiment, each user may be associated with a unique virtual extension number. A virtual extension number may include an extension number that is not associated with an individual telephone device, but rather is associated with an individual user. The virtual extension numbers may be specified by calling parties. User identification field 510 may store this unique virtual extension number. In another embodiment, the information may include a portion of the dialed telephone number (e.g., the last four digits of the telephone number).

PIN field 520 may store a personal identification code associated with the user identified in user identification field 510. In one embodiment, the personal identification code may include a sequence of characters that may be used to authenticate the user identified in the corresponding user identification field 510.

Location field 530 may store information identifying a location of the user identified in user identification field 510. The location information may be stored as a group of coordinates (e.g., a set of longitude and latitude coordinates), as information identifying a room within the area served by PBX 120, or in another manner. In one embodiment, the manner in which the location information is stored in location field 530 may match the manner in which the telephone location information is stored in location field 310 of database 300 to facilitate identifying the location of a user in relation to the locations of telephone devices 130.

Ring signal field 540 may include information identifying a call signal ring tone that is associated with the user identified in user identification field 510. In one embodiment, the call signal ring tone may be uniquely associated with the user identified in user identification field 510. The call signal ring tone may include a ring pattern, ring music, an announcement of the user's name, etc.

Figure 6:
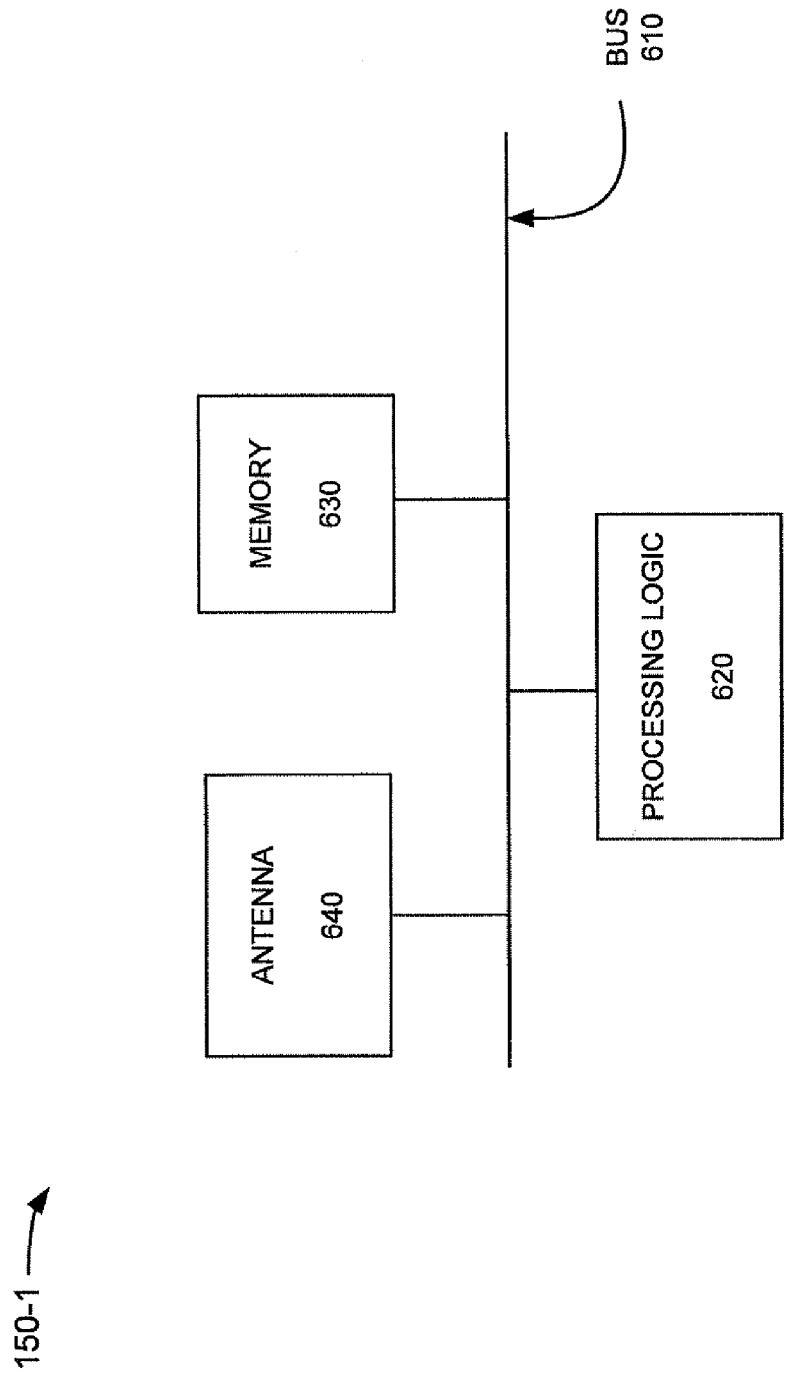
FIG. 6 is an exemplary diagram of the locator unit of FIG. 1.

FIG. 6 is an exemplary diagram of locator unit 150-1 in an exemplary embodiment. Locator units 150-2 through 150-M may be similarly configured. As illustrated, locator unit 150 may include a bus 610, processing logic 620, a memory 630, and an antenna 640. Locator unit 150-1 may include other components (not shown) that aid in receiving, transmitting, and/or processing data. Moreover, other configurations are possible. For example, locator unit 150-1 may not include processing logic 620 and/or memory 630 in other exemplary embodiments.

Bus 610 may permit communication among the components of locator unit 150-1. Processing logic 620 may include any type of processor or microprocessor that interprets and executes instructions. In other embodiments, processing logic 620 may be implemented as, or include, an ASIC, FPGA, or the like. Memory 630 may include a RAM or another type of dynamic storage device that stores information and instructions for execution by processing logic 620 and/or a ROM or another type of static storage device that stores static information and instructions for processing logic 620. Antenna 640 may include any type of antenna capable of receiving and/or transmitting data. In one embodiment, antenna 640 may include, for example, an inductive antenna, a capacitive antenna, a printed dipole antenna, a coil antenna, etc.

As will be described in detail below, locator unit 150-1 may perform operations in response to processing logic 620 executing software instructions contained in a computer-readable medium, such as memory 630. The software instructions may be read into memory 630 from another computer-readable medium or from another device via antenna 640. The software instructions contained in memory 630 may cause processing logic 620 to perform processes that will be described later. Alternatively, hardwired circuitry may be used in place of or in combination with software instructions to implement processes consistent with exemplary embodiments. Thus, systems and methods described herein are not limited to any specific combination of hardware circuitry and software.

Figure 7:
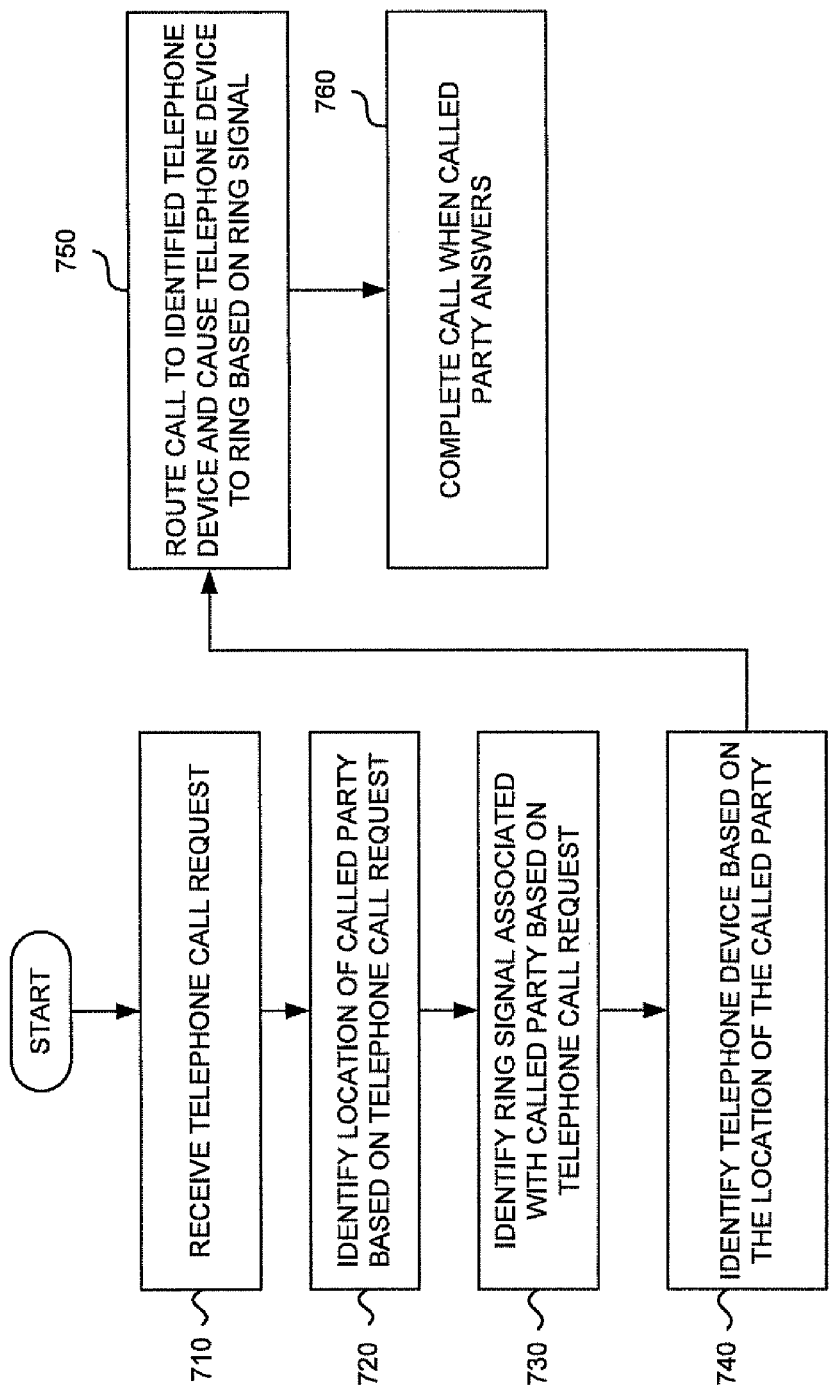
FIG. 7 is a flow chart of exemplary processing for routing a telephone call.

FIG. 7 is a flow chart of exemplary processing for routing a telephone call according to an exemplary embodiment. Processing may begin with PBX 120 receiving a telephone call request (block 710). The telephone call request may originate at a telephone device within the area served by PBX 120 (e.g., one of telephone devices 130) or may originate from outside the area served by PBX 120 (e.g., from telephone device 110 via network 160). The telephone call request may include, or be associated with, a virtual extension number for a called party. In one embodiment, PBX 120, or another device, may request that the calling party indicate the virtual extension number for the called party.

The location of the called party may be identified (block 720). For example, PBX 120 may transfer the virtual extension number to user locator 140. User locator 140 may use the virtual extension number to lookup the location of the called party in database 500 (e.g., from location field 530).

A ring signal that is associated with the called party may be identified (block 730). For example, user locator 140 may use the virtual extension number to lookup a ring signal that is associated with the called party in database 500 (e.g., from ring signal field 540).

Although not illustrated in FIG. 7, user locator 140 may further, in some embodiments, retrieve a PIN for the called party. For example, user locator 140 may use the virtual extension number to lookup a PIN that is associated with the called party in database 500 (e.g., from PIN field 520).

A telephone device 130-1 through 130-N may be identified based on the location of the called party (block 740). For example, user locator 140 may compare the location of the called party to the locations of telephone devices 130 maintained in database 400. In one embodiment, user locator 140 may identify a telephone device 130-1 through 130-N that is located closest to the location of the called party. In another embodiment, user locator 140 may identify a telephone device 130-1 through 130-N that is in a same room as the called party. User locator 140 may transfer the telephone identification information and the ring signal to PBX 120. In some embodiments, user locator 140 may further transfer the identified PIN.

PBX 120 may route the telephone call request to the identified telephone device 130-1 through 130-N and cause the identified telephone device 130-1 through 130-N to ring based on the identified ring signal (block 750). Using a ring signal that is unique to the called party allows the called party to know that the call is directed to him/her in those situations when multiple users are in proximity to the ringing telephone device.

The telephone call may be established when the called party answers the ringing telephone device 130-1 through 130-N (block 760). In some embodiments, a challenge may be issued to the user answering the ringing telephone device 130-1 through 130-N. For example, upon answering the ringing telephone device 130-1 through 130-N, the user may be presented with an audible prompt for their PIN. Upon receipt of a PIN from the telephone device 130-1 through 130-N, PBX 120 may compare the received PIN to the PIN associated with the called party. If the received PIN matches the PIN associated with the called party, which verifies the identity of the answering party, the call may be completed. In one embodiment, PBX 120 (or another device) may log incorrect PIN responses and information identifying the location(s) from where the responses originate. Security personnel may then be dispatched to the location(s).

PBX 120 or user locator 140 may be associated with one or more call handling rules for those situations in which the called party is not in proximity to a telephone device 130-1 through 130-N (e.g., the called party is not in the office, is in the restroom, etc.). The call handling rules may be user-specified. The call handling rules may include, for example, parking the telephone call, sending the calling party to a voicemail system, etc.

Figure 8:
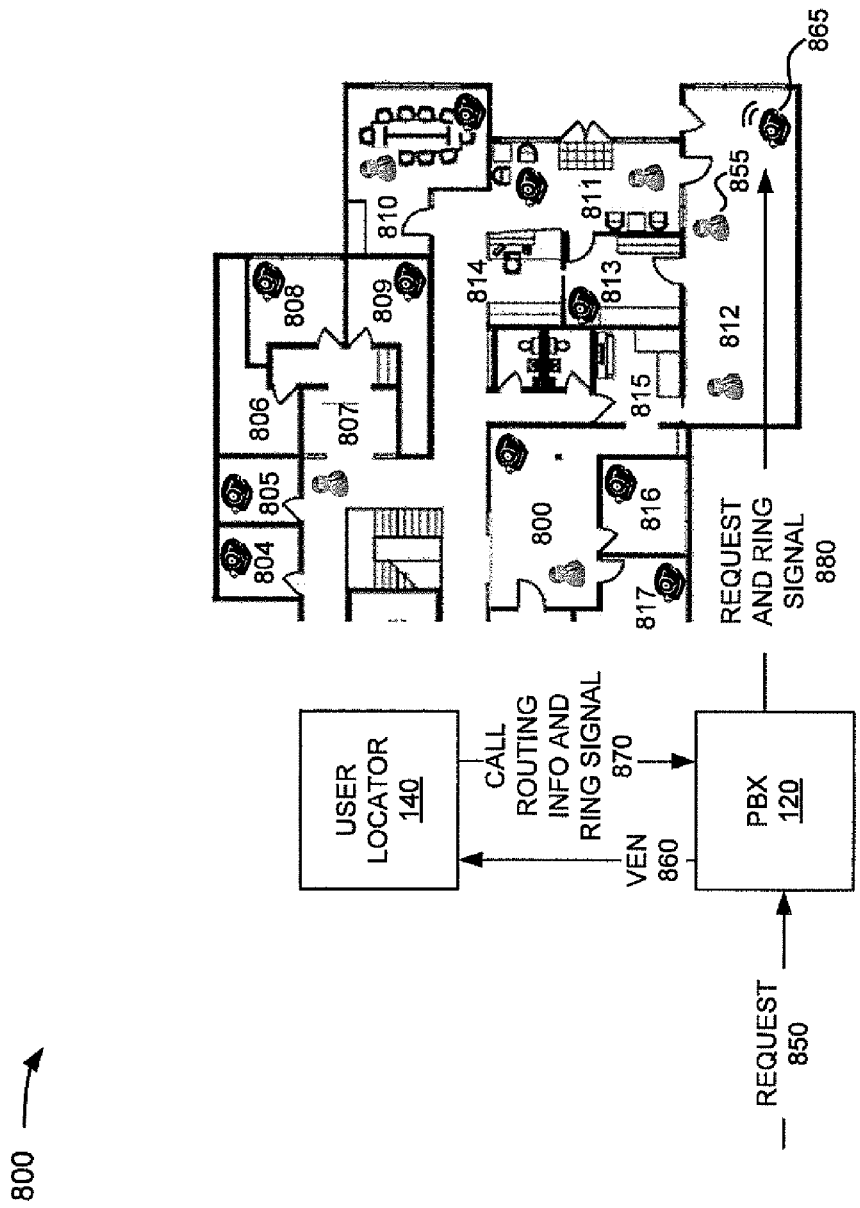
FIG. 8 illustrates an example of the processing described in FIG. 7.

The following example of FIG. 8 illustrates the processing described above with respect to FIG. 7. Assume that PBX 120 serves a particular business, whose floor plan is depicted in FIG. 8. User locator 140 may maintain up-to-date location information for the personnel employed by the business via RFID tracking, GPS tracking, self-reporting, IR beacon tracking, badge reading, biometric scanning, multilateration, and/or some other technique. Moreover, user locator 140 may maintain information regarding the location of telephone devices maintained by the business.

Now, assume that a telephone call request 850 comes into PBX 120 for an employee of the business (denoted as employee 855). The telephone call request may include, as described above, a virtual extension number (or another user identifier). PBX 120 may transfer the virtual extension number 860 to user locator 140. User locator 140 may use the virtual extension number to identify a location of employee 855 and a ring signal that is associated with employee 855. Moreover, user locator 140 may use the location of employee 855 to identify a telephone device (denoted as telephone device 865) that is located nearest to employee 855. User locator 140 may transfer information 870 for routing the call to telephone device 865 and the identified ring signal to PBX 120. PBX 120 may forward a call request 880 to telephone device 865, which may cause telephone device 865 to ring with a selective ring tone or other signal (based on the identified ring signal) to alert employee 855 of the incoming call.

If employee 855 picks up telephone device 865, the call is established to telephone device 865.

Embodiments described herein route an incoming telephone call to a telephone device that is nearest to a location of the called party. In facilities where wireless communications are prohibited or not possible, the techniques described herein provide a secure way of routing telephone calls to parties in these facilities.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while a series of acts has been described with respect to FIG. 7, the order of the acts may be varied in other implementations consistent with the invention. Moreover, non-dependent acts may be implemented in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
    a locator device to:
        track a location of a user,
        store information identifying locations of a plurality of telephone devices and a virtual extension number that corresponds to the user,
        look up a PIN, based on the virtual extension number, of the user, and
        identify, in response to an incoming telephone call request for the user, one telephone device of the plurality of telephone devices based on the PIN, a location of the one telephone device, and the location of the user.

2. The system of claim 1 where the locator device is further to:
    store information identifying a ring signal for the user.

3. The system of claim 2 where the locator device is further to:
    retrieve the information identifying the ring signal in response to the incoming call request for the user.

4. The system of claim 3 where the locator device is further to:
    transfer information identifying the one telephone device and the information identifying the ring signal to a private branch exchange for routing the incoming telephone call request to the one telephone device and causing the one telephone device to ring based on the ring signal.

5. The system of claim 1 wherein where the locator device is further to:
    transfer information identifying the one telephone device to a private branch exchange for routing the incoming telephone call request to the one telephone device.

6. The system of claim 5 where the private branch exchange is to:
    route the incoming telephone call request to the one telephone device,
    request, when a party answers the one telephone device, a code from the answering party,
    receive the code from the one telephone device, and
    establish a telephone call to the one telephone device when the code matches a code for the user.

7. The system of claim 1 where, when tracking the user, the locator device is to use one of radio frequency identification (RFID) tracking, global position satellite (GPS) tracking, beacon tracking, badge scanning, self-reporting, or biometric scanning.

8. The system of claim 1, where
    the incoming telephone call request includes a user identifier that is associated with the user, and
    the locator device uses the user identifier to retrieve the location of the user.

9. The system of claim 1 where the user identifier includes the virtual extension number.

10. The system of claim 1, where
    the incoming telephone call request includes a user identifier that is associated with the user, and
    the locator device is associated with a memory that associates the user identifier with a location of the user and a ring signal.

11. A method comprising:
    receiving a user identifier that is associated with a user in connection with an incoming telephone call request;
    retrieving information identifying a location of the user using the user identifier;
    identifying a virtual extension number that corresponds to the user;
    looking up a PIN, based on the virtual extension number, of the user;
    identifying information identifying a telephone device based on the PIN and the information identifying a location of the user; and
    forwarding the information identifying a telephone device to a private branch exchange for routing the incoming telephone call request to the telephone device.

12. The method of claim 11 where the user identifier includes the virtual extension number.

13. The method of claim 11 further comprising:
    retrieving information identifying a manner in which the telephone device is to ring; and
    forwarding the information identifying the manner in which the telephone device is to ring to the private branch exchange for causing the telephone device to ring according to the manner.

14. The method of claim 11 further comprising:

tracking the location of the user; and associating the tracked location with the user identifier in a memory.

15. The method of claim 14 where the tracking includes performing at least one of radio frequency identification (RFID) tracking, global position satellite (GPS) tracking, beacon tracking, badge scanning, self-reporting, or biometric scanning.

16. A system comprising:

a locator device including:

a memory to:

associate a user identifier with a location of a user and a ring signal, associate information identifying a plurality of telephone devices with locations of the plurality of telephone devices, associate a virtual extension number with the user, a processor to:

look up a PIN, based on the virtual extension number, of the user, identify one telephone device of the plurality of telephone devices based on the PIN, a location of the one telephone device, and the location of the user, and provide information relating to the one telephone device of the plurality of telephone devices and the ring signal in response to the identifying.

17. The system of claim 16 where the processor is further to:

track the location of the user, and store the location of the user in the memory.

18. The system of claim 17 where, when tracking the location of the user, the processor is to:

perform at least one of radio frequency identification (RFID) tracking, global position satellite (GPS) tracking, beacon tracking, badge scanning, self-reporting, or biometric scanning.

19. The system of claim 16 where the user identifier includes the virtual extension number.

20. The system of claim 16 further comprising:

a private branch exchange to:

receive a telephone call request that is associated with the user identifier, send the user identifier to the locator device, receive, from the locator device, the information relating to the one telephone device, the PIN, and the ring signal, route the telephone call request and information relating to the ring signal to the one telephone device to cause the one telephone device to ring based on the ring signal, request, when a party answers the one telephone device, a code from the answering party, receive the code from the one telephone device, and establish a telephone call to the one telephone device when the code matches a code for the user.

21. The system of claim 20 where the private branch exchange routes the telephone call request and the information relating to the ring signal to the one telephone device via a wired connection.

* * * * *